T. O. KEMP,
Assignor to J. F. HOTCHKISS.
Boiler-Cleaner.
No. 7,916. Reissued Oct. 16, 1877.
FIG. I
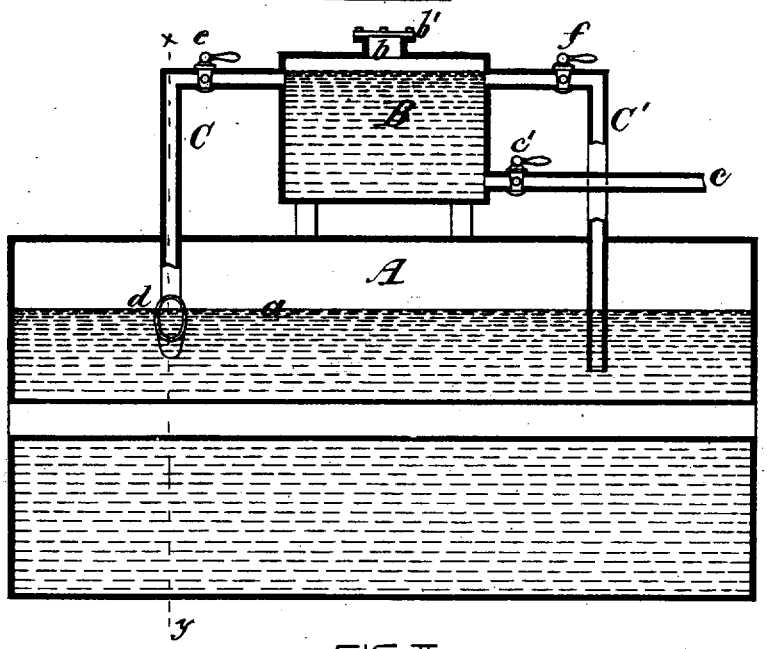
FIG. II
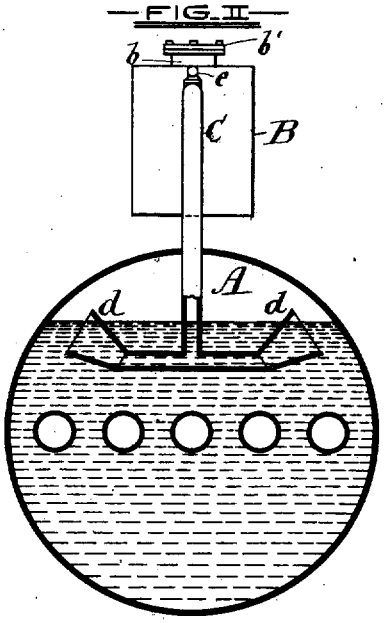
WITNESSES.
Wm. H. Towson
W. W. Wharton.
INVENTOR.
Thomas O. Honor Kemp,
by Atty. W. T. Thrall
Attorneys.
THE NORRIS PETERS CO., PHOTO-LITHO., WASHINGTON, D. C.

UNITED STATES PATENT OFFICE.

THOMAS O. KEMP, OF BEAMSVILLE, ONTARIO, CANADA, ASSIGNOR TO JAMES F. HOTCHKISS, OF BAY CITY, MICHIGAN.

IMPROVEMENT IN BOILER-CLEANERS.

Specification forming part of Letters Patent No. 166,782, dated August 17, 1875; Reissue No. 7,916, dated October 16, 1877; application filed September 22, 1877.

*To all whom it may concern:*

Be it known that I, THOMAS OXBORROW KEMP, of Beamsville, Canada, have invented certain Improvements in Boiler-Cleaners, of which the following is a specification, reference being had to the accompanying drawings, and to the letters of reference marked thereon.

My invention consists in an improved method of removing impurities or foreign matters found in the water of steam-boilers, and which are thrown to the surface by the ebullition thereof, together with the mechanical appliances for carrying said method into effect, as hereinafter described.

The operation of this invention is dependent upon the action of the laws of gravity as applied to waters of different temperatures, and to substances of different specific gravities; and these well-known laws, by the construction and arrangement of the parts herein described, are, as I believe, utilized for the purposes designated to an extent heretofore unknown.

The method employed consists in carrying the impurities raised to the surface by ebullition below that surface, and then upward into a reservoir, with an ascending current induced by the displacement of a descending cooler body of water passing from said reservoir, the said impurities being deposited in the reservoir by precipitation.

In the accompanying drawings, forming a part hereof, Figure 1 is a longitudinal section of a boiler having my improved cleaning apparatus applied thereto. Fig. 2 is a cross-section on line *x y*.

Similar letters of reference indicate similar parts of the invention in both the views.

A is the steam-boiler, the water-level of which is indicated by *a*. B is an exterior steam-tight reservoir, having an upper cleaning-opening, *b*, with its cover *b'*, and a lower blow-off pipe, *c*, and cock *c'*. C is a pipe, the end of the vertical member of which, entering the boiler, forms an inverted T, each end of which is provided with a bell-mouth, *d*, rising slightly above the highest level of the water. The pipe C, where it passes through the shell of the boiler, is suitably fastened thereto. The horizontal member of the pipe C is secured to one end of the reservoir B, and is supplied with a cock, *e*. Similarly attached to the reservoir, at the other end thereof, is another pipe, C', the horizontal section of which is provided with a cock, *f*, the vertical section passing through the shell of the boiler, and being secured thereto. The end of the said pipe extends into the boiler-water a little below the lowest level thereof and the end of the pipe C.

It is a rudimentary principle in the art of steam-engineering that in a boiler under pressure all of the interior parts thereof, and all exterior chambers or recipients in communication therewith, are subjected, practically, to the same pressure. Thus, in the present case, communication being established between the boiler A and reservoir B, the water forced into said reservoir is subject to a pressure common to both it and the boiler-water, and as long as its density and specific gravity remain the same as those of the water in the boiler, (consequent upon equal temperature,) there will be an equilibrium established in the boiler, reservoir, and pipes, and no circulatory motion through the same will occur. But, as a body of water removed from actual contact with the greater body of heated water in the boiler, the reservoir-water begins to cool, and, gathering density in cooling, overcomes the equilibrium established, and commences to descend the pipe C'. At the same moment the bell-mouths of the pipe C admit an inflowing upward column of water, which seeks to again establish the former equal condition; and the circulation, once begun, will continue indefinitely. As the impurities are thrown to the water-level by ebullition they are received within the bell-mouths *d*, and carried below the water-level, up the pipe C, and deposited in the reservoir B. It will be observed that as the horizontal member of the T to which the bell-mouths lead is below the surface, no steam can enter said pipe and be carried to the reservoir. This construction constitutes an effective steam-trap. The fall of the temperature of the water holding the impurities in suspension causes them to be precipitated to the bottom of the reservoir, and the water returned to the boiler is practically clear.

The circulation of the water through the boiler, reservoir, and pipes may be inuagurated by closing all communication between the boiler and reservoir after the latter is filled with water by pressure, by closing the cocks in the pipes C C′ and allowing the reservoir-water to cool rapidly, when the cocks would be again opened.

The impurities may be removed from the reservoir by blowing them through the pipe *c*, the cock *c′* being opened for the purpose, or they may be extracted through the cleaning-opening *b*, the cover *b′* being removed.

In addition to the afore-named results attained by the use of the bell-mouths *d*, they allow the ordinary rise and fall of the water-level without admitting steam to the reservoir. Then, the pipe C′ for the descending column of water, terminating just below the water-level, is at all times removed from the heavier sediment or scale, which settles at the lower parts of the boiler and around its sides, and the inflowing of the return current to the boiler is never obstructed by such deposit.

I am aware that it is not new in steam-boilers to make the water circulate from the boiler to a mud-drum and a water-leg in the vicinity of the furnace; but Having described my invention, what I claim as new, and wish to secure by Letters Patent of the United States, is—

1. The method of collecting impurities from the water-level of steam-boilers, raised thereto by ebullition, by carrying them beneath said level and upward into a reservoir with an ascending current induced by the displacement of a cooler body of water in said reservoir, and depositing the impurities therein by precipitation, substantially as specified.

2. As an element in a sediment-collector for steam-boilers, a pipe for the ascending current, suspended within the boiler, in combination with and terminating in a submerged inlet-pipe, having mouths extending to the water-level, and forming a steam-trap, substantially as described.

3. In a sediment-collector, bell-mouths suspended within the boiler at the water-level, and leading to a submerged pipe, and an ascending pipe combined with a reservoir, and a descending pipe extending within the boiler, and reaching just below the water-level, substantially as and for the purposes described.

4. The pipe C, having the submerged inverted-T end and bell-mouths *d*, combined with the reservoir B, pipe C′, and cocks *e f*, substantially as and for the purposes specified.

5. A bell-mouth or device having an enlarged receiving area for gathering the sediment, and suspended within the boiler by means of a pipe extending into the same from the upper shell thereof, the said bell-mouth and pipe constituting the induction-channel for the upward current, carrying the sediment, combined with a reservoir and a return-pipe leading from the same to the boiler-water, the whole forming a means of circulation for the boiler-water, and for removing impurities therefrom, substantially as herein set forth.

In testimony whereof I have hereto subscribed my name, in the presence of two subscribing witnesses, this 4th day of September, A. D. 1877.

THOMAS OXBORROW KEMP.

Witnesses:
GEO. A. SKINNER,
THOMAS E. HAYS.